L. W. PECK.
MEASURING APPARATUS.
APPLICATION FILED APR. 25, 1916. RENEWED JAN. 15, 1919.

1,312,351.

Patented Aug. 5, 1919.
2 SHEETS—SHEET 1.

Witnesses
A. C. Newkirk

Inventor
L. W. Peck
By Victor J. Evans
Attorney

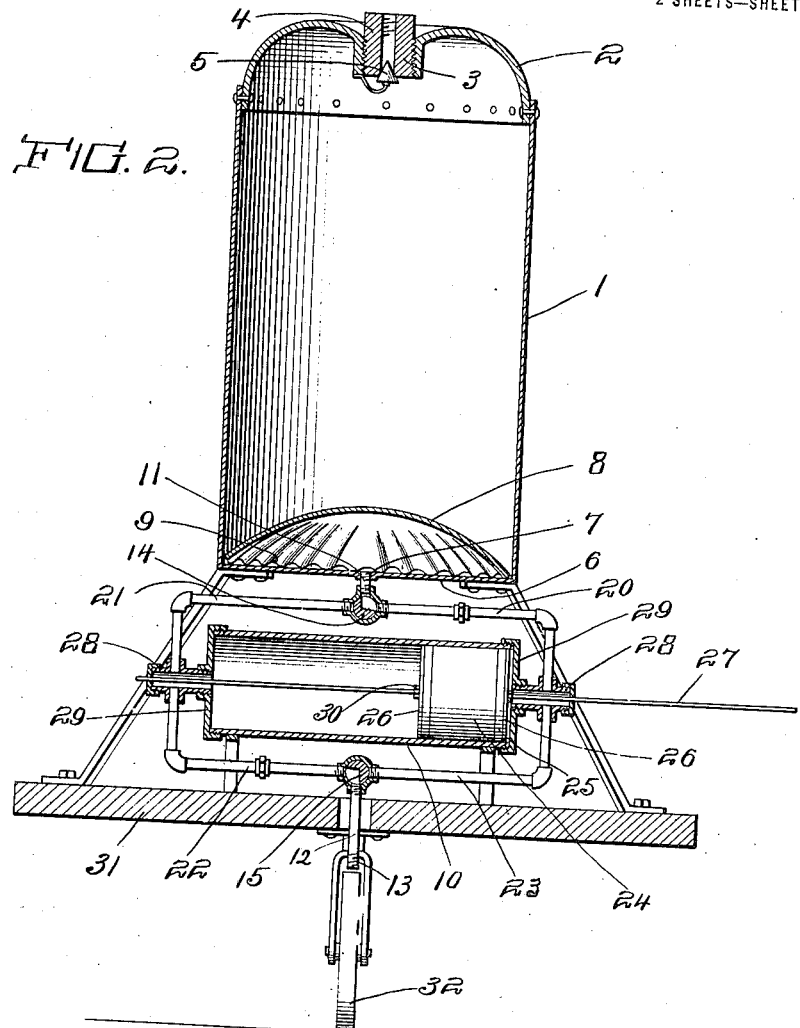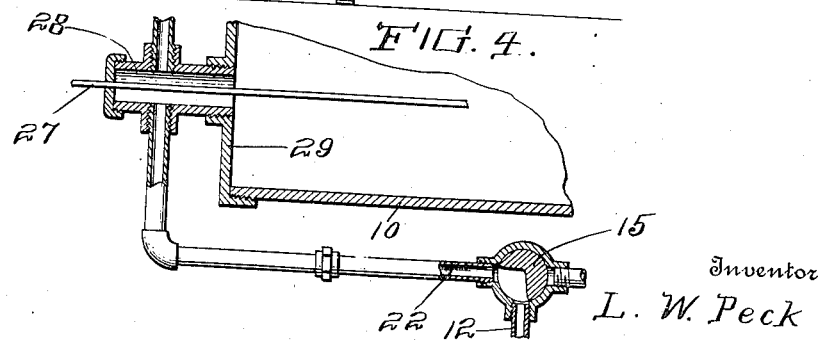

UNITED STATES PATENT OFFICE.

LAWRENCE W. PECK, OF WICHITA, KANSAS.

MEASURING APPARATUS.

1,312,351.  Specification of Letters Patent.  Patented Aug. 5, 1919.

Application filed April 25, 1916, Serial No. 93,517. Renewed January 15, 1919. Serial No. 271,342.

*To all whom it may concern:*

Be it known that I, LAWRENCE W. PECK, a citizen of the United States, residing at Wichita, in the county of Sedgwick and State of Kansas, have invented new and useful Improvements in Measuring Apparatus, of which the following is a specification.

This invention is an improved measuring apparatus, especially adapted for use for measuring transmission gear grease and cup grease, but also adapted for use for measuring other similar substances, the object of the invention being to provide an improved machine of this kind which may be manually controlled and by means of which grease or the like may be measured and dispensed by the pound.

The invention consists in the features of construction, combination, and arrangement of devices, hereinafter fully described and claimed.

In the accompanying drawings:—

Figure 1 is an elevation of a grease measuring machine constructed and arranged in accordance with my invention.

Fig. 2 is a vertical sectional view of the same.

Figs. 3 and 4 are detail sectional views.

Figures 1, 3:
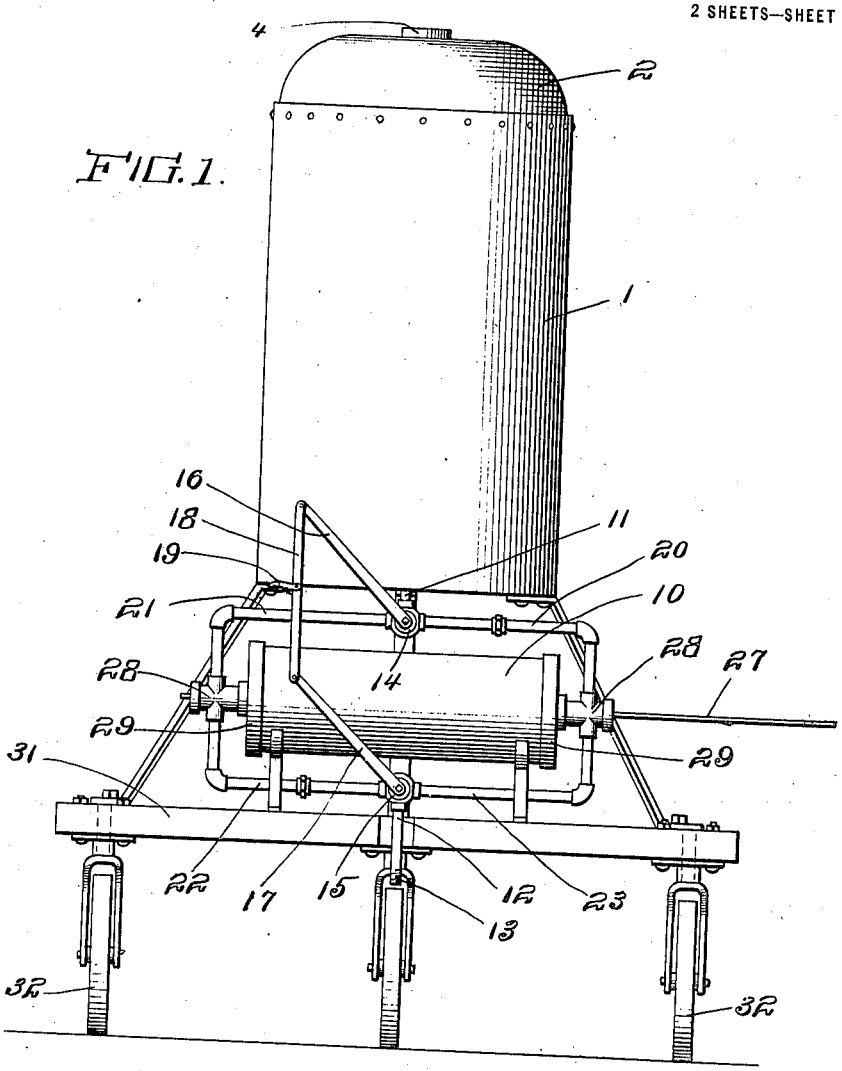

In the embodiment of my invention, I provide a storage tank 1 which in practice is preferably a steel barrel which will withstand internal air pressure of from eighty to ninety pounds. The tank may, however, be of any suitable size and shape and may be of any suitable construction. The top 2 of the tank is provided with a threaded central opening in which a plug 3 is screwed. The plug is formed with an upwardly extending nipple 4 for the attachment of a hose leading from a suitable air compressor and wherewith, the tank may be supplied with compressed air at any desired pressure. The plug also has a valve 5 which serves to close the bore of the plug against back pressure and prevent leakage of air from the tank.

The bottom 6 of the tank is provided with a central discharge opening 7. A false bottom 8 is arranged in the tank and is substantially dome-shaped, or concavo-convex in cross section, with the convex side uppermost, and said false bottom is provided with radial corrugations 9 which form openings all around the false bottom and between the same and the bottom of the tank.

This false bottom by reason of its shape and also by the provision of its radial corrugations, enables all the grease or other material in the tank to be discharged therefrom, by compressed air, and through the discharge opening in the bottom of the tank, the corrugations causing the grease, when under atmospheric pressure to feed all the way around the false bottom and to pass out through the discharge opening in the bottom of the tank.

A measuring cylinder 10 is arranged with an inlet connection 11 which is connected to the discharge opening in the bottom of the tank. This inlet connection is midway between the ends of the cylinder and on one side thereof. A discharge connection 12 is also mid-way between the ends of the cylinder and is arranged opposite the inlet connection and is provided with a nipple 13 for the attachment of a discharge hose.

A pair of reversely arranged three-way plug valves 14, 15 are respectively mounted for turning movement in the valve seats formed by the inlet and discharge connections of the cylinder and are also respectively provided with operating levers 16, 17, which are connected together by a link 18. The link is provided with a handle 19 which may be grasped by the operator and employed for turning as desired. Channels 20, 21 lead from the seat of the valve 14 to tubular extensions 28 on the heads of the cylinder. Similar channels 22, 23, lead from said tubular extensions to the seat of the valve 15. The valves being reversely arranged as shown, enable the cylinder to be supplied at one end with grease from the tank cylinder, as will be understood, that is to say, when the valve 14 establishes communication between the connection 11 and one end of the cylinder through the channel 20, which closes connection with the other end of the cylinder through the channel 21 and at the same time, the valve 15 opens communication between the last-named end of the cylinder and the discharge 13, through the channel 22, while closing communication with the first-named end of the cylinder through the channel 23.

A piston 24 is arranged for reciprocating movement in the cylinder and is provided with packing rings 25 and with heads 26. A rod 27 passes through the center of the piston and also passes through and is arranged to reciprocate in the extensions 28 on the cylinder head. Said extensions are provided with suitable packings to prevent leakage around the rod. Nuts 30 are screwed on the piston rod and bear against the ends of the piston and thus serve to connect the piston to the rod, so that the rod will move with the piston and also serve as stops to limit the extent of the stroke of the piston and prevent it from going to the extreme ends of the cylinder and closing the ports formed by the channels.

The cylinder and the tank are mounted on a truck 31 which enables the machine to be readily wheeled to any place where it is to be used and the truck is here shown as mounted on crazy wheels 32 so that it may be turned and drawn in any desired direction.

The capacity of the cylinder is such that either end thereof, when the piston is in the other end, will hold exactly one pound of grease or any suitable unit quantity. When the valves are turned in one direction, grease will be admitted to one end of the cylinder and will force the piston toward the other end of the cylinder, thus causing the piston to force the grease from the last-named end of the piston out through the connection 13 and when the piston reaches such end of the cylinder, the first-named end of the cylinder will be completely filled with grease representing a unit of measure as will be understood. At the end of each stroke of the piston, the valves must be returned to reverse their position for a further supply of measured grease from the machine, as desired, each manipulation of the valves causing the piston to make only one stroke.

It is believed that from the foregoing description, the nature and advantages of the invention will be readily apparent without requiring a more extended explanation and therefore the same has been omitted. However, I desire to have it understood that various changes in the construction and arrangement of parts may be resorted to when desired as fall within the scope of the appended claim.

Having described the invention, what is claimed is:

In a measuring apparatus of the class described, a measuring cylinder having tubular extensions at the ends, valved feed connections discharging into said tubular extensions, valved discharge connections leading from said tubular extensions, a piston arranged to reciprocate in the cylinder and a rod attached to and movable with said piston, said rod extending through and reciprocating in said tubular extensions, and being of less diameter than said tubular extensions, and said tubular extensions being provided with guides for said rod.

In testimony whereof I affix my signature in presence of two witnesses.

LAWRENCE W. PECK.

Witnesses:
C. A. McCorble,
Frances Sanders.